ELECTRON DISCHARGE DEVICE OF THE RESONATOR TYPE

Filed Aug. 2, 1948 2 Sheets-Sheet 1

INVENTOR
MAURICE APSTEIN
BY J. Jordan Kunik
ATTORNEY

Oct. 20, 1953 M. APSTEIN 2,656,483

ELECTRON DISCHARGE DEVICE OF THE RESONATOR TYPE

Filed Aug. 2, 1948 2 Sheets-Sheet 2

INVENTOR
MAURICE APSTEIN
BY I. Jordan Kunik
ATTORNEY

Patented Oct. 20, 1953

2,656,483

UNITED STATES PATENT OFFICE 2,656,483

ELECTRON DISCHARGE DEVICE OF THE RESONATOR TYPE

Maurice Apstein, Bethesda, Md.

Application August 2, 1948, Serial No. 41,978

16 Claims. (Cl. 315—4)

This invention relates to improvements in resonant circuit elements suitable for inclusion in a system for transmission and/or reception of electromagnetic waves.

In certain applications of electromagnetic wave systems it is desirable to tune the equipment over an appreciable part of the spectrum at a rapid rate. It is also desirable to be able to accomplish synchronized tuning of several resonant circuits without mechanical interconnection. The present invention provides a resonant circuit element which can be incorporated into electromagnetic wave systems in such manner that the system may be tuned by electronic means.

An object of the invention, therefore, is to provide a resonant system whose operating frequency is controllable by electronic means.

Another object of the invention is to provide a means of varying the natural period of a resonant circuit more rapidly than can be accomplished by mechanical means.

A further object of the invention is to provide a system of transmission and reception of electromagnetic waves whereby tuning to various operating frequencies may be accomplished by non-mechanical means.

Another object of the invention is to provide a wide range frequency modulation system.

A further object of the invention is to provide a resonant circuit element which exhibits a continuously variable resonance characteristic as a function of an applied control voltage.

Another object is to provide a resonator or resonant circuit element comprising a conductive sheet in the form of a body having a non-uniform cross-section and a slot, said element being capable of exhibiting an infinite number of oscillating modes, said modes being selectable by variably positioning an electron beam with respect to said circuit element.

A still further object of the invention is to provide a series of variable frequency amplifying tubes whose operating frequency may be changed over a wide tuning range by application of suitable modulating voltages.

Another object of the invention is to provide an oscillation generator whose frequency of operation may be controlled by an applied control voltage.

A further object of the invention is to provide a resonant system capable of accommodating a plurality of simultaneous signals, said signals being selectable at will by electronic means.

A still further object of the invention is to provide a resonant system capable of exhibiting an infinite number of resonances without discontinuity over a given portion of the spectrum, said resonances being selectable at will by electronic means.

Other objects of the invention will be apparent from the following description and accompanying drawings taken in connection with the appended claims. However, I desire to have it distinctly understood that I do not intend to limit myself to the exact details shown or described, but that I intend to include as part of my invention all such obvious changes and modifications of parts as would fall within the scope of the claims.

Referring to the accompanying drawings.

Figures 3, 4, 4A, 5:
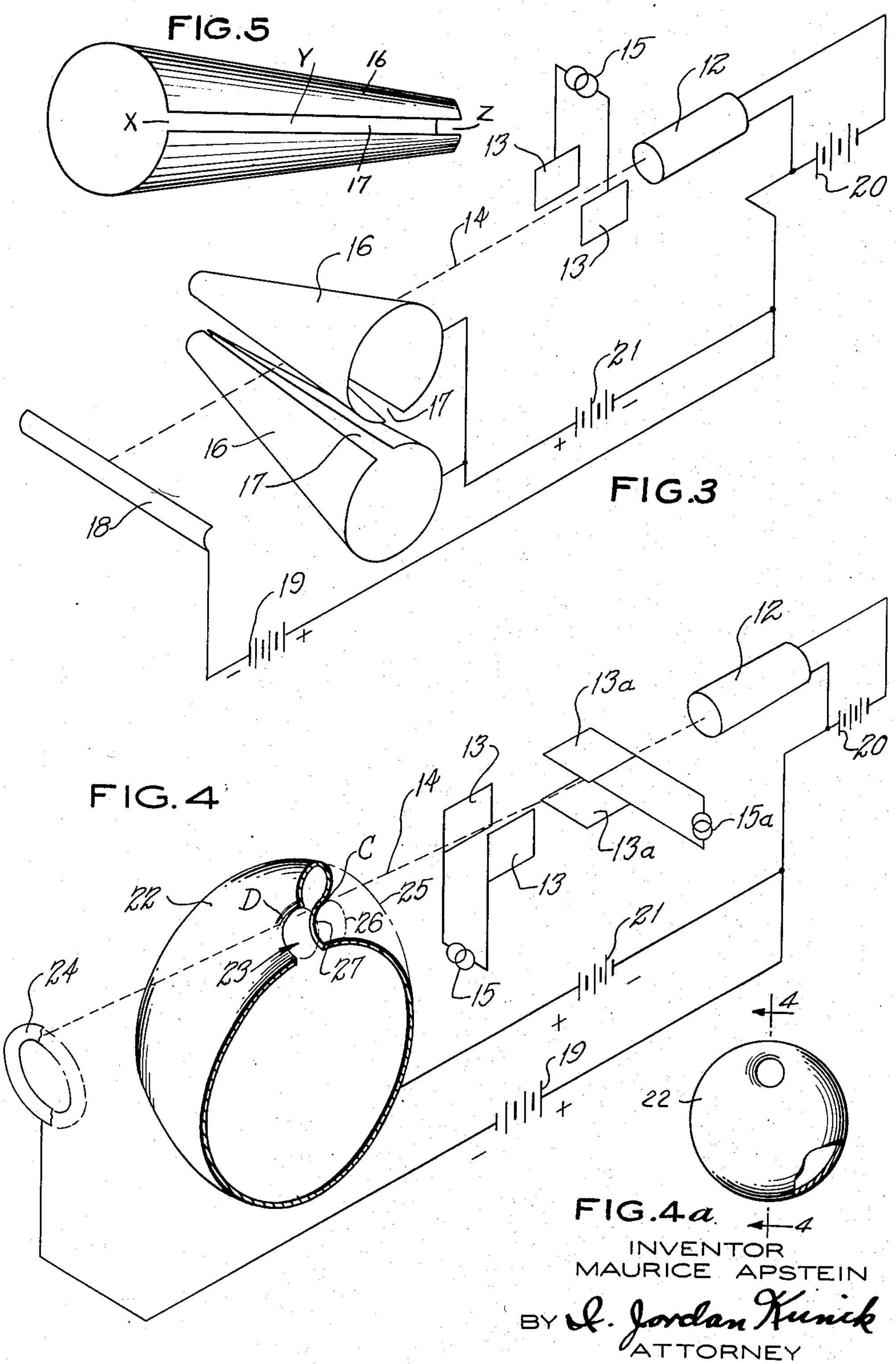
Fig. 4 is a perspective schematic view of another embodiment of my invention, the resonator element therein being shown as a vertical section thereof.

Fig. 4*a* is a side view of the toroid resonator element, a section of which is shown in Fig. 4;

Figure 5 is a perspective schematic view of one form of resonant element embodying my invention.

Like reference numerals are employed throughout the figures of the drawings where similar components are indicated.

The basic principle of the system involves the use of a tapered cavity or semi-cavity resonator of such geometry that its resonant frequency in the desired mode will be a function of the point of excitation. A deflectable electron beam is used to excite the cavity at different points, resulting in different output frequencies.

If a conductive sheet is fabricated into a body surrounding a cavity having a non-uniform cross-section with a slot left open along one element of the surface as in Figure 5, for example, it may be regarded as a single turn inductance of varying diameter. Alternatively, it may be considered an infinite number of single turns in parallel, each slightly larger or smaller than its adjacent turns. Thus, viewed from point X it will appear to have an inductance larger than that which appears at point Y, which in turn is larger than that which appears at point Z. The conductive cone may preferably be made of copper, silver or any other good electrical conductor, but also may be made of any other material whose surface has been coated so as to have a high surface conductivity.

If an electron tube is connected across the slot in such fashion as to cause oscillation, the oscillation frequency will be different for each position of the tube along the slot. The lowest frequency will be generated when the tube is at X and the highest when the tube is at Z. Moving the tube from X to Z will result in a continuously variable output frequency between these limits. Using an exponential taper instead of a straight sided cone results in a linear frequency versus displacement relationship.

There is thus established the principle of a resonator which exhibits a variable resonance characteristic as a function of the point of excitation, said characteristic varying with the gradient of length of the element. This is in contrast with the usual concept for symmetrical resonators in which the resonant frequency for a given mode is considered to be independent of the point of excitation but is a function of the overall dimensions only. When my resonator is excited by means of an electron beam, a resonant circuit element is provided which is capable of exhibiting an infinite number of oscillating modes, said modes being selectable by variably positioning said electron beam, for example, with respect to said circuit element.

Figures 1, 1A, 2:
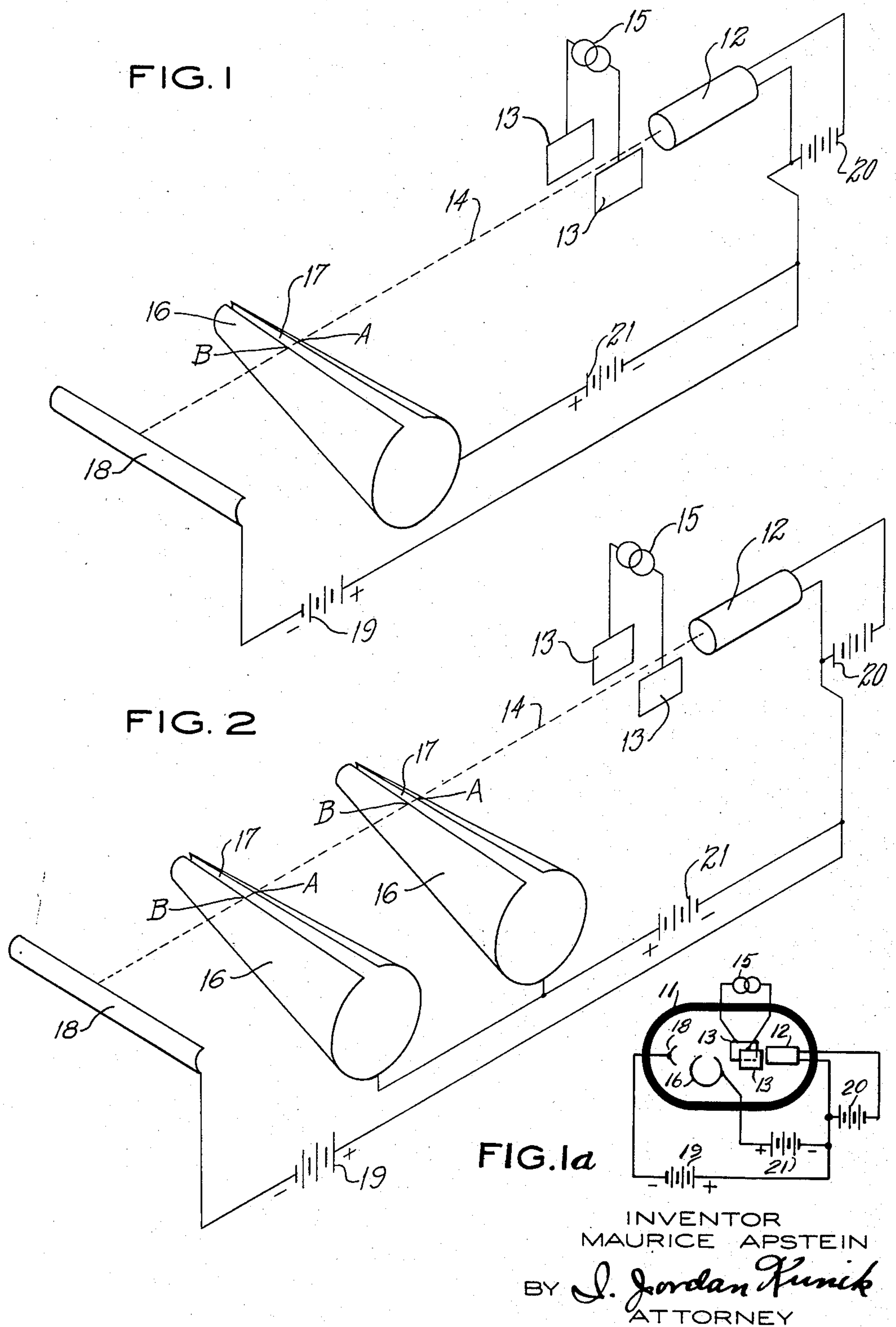
Figure 1 is a perspective schematic view of the elements of the invention herein, some of said elements being enclosed by an envelope to form a vacuum tube, as shown in Fig. 1*a*.
Figures 2 and 3 are perspective schematic views of different embodiments of my invention.

Referring now to the drawings, Figs. 1 and 1*a* show a schematic representation of an adaptation of the tapered resonator of Figure 5 in a vacuum tube 11 in which electron gun 12 acts as the source of a concentrated beam 14 of electrons which passes between a pair of deflecting plates 13. A source of deflecting potential 15 shown symbolically as a generator of a deflecting potential, serves to deflect beam 14 as desired. A conical or tapered resonator 16 in whose surface is provided a slot 17 is so positioned that beam 14 travels across said slot 17 in a path substantially tangential to the cone surface thereby coupling said beam to said tapered resonator. A repeller or reflector electrode 18, which is negatively charged with respect to the electron beam 14 by power supply 19 shown as a battery, serves to reflect electron beam 14 back across slot 17. A heater power supply 20 is a source of potential for electron gun 12 while source of potential 21 maintains resonator 16 positive with respect to electron beam 14. Power supplies 20 and 21 are shown symbolically as batteries but this is not restrictive. The whole device except for power supplies 19, 20, and 21 and the source of deflecting potential 15 is enclosed in an evacuated container such as a glass bulb 11, or other suitable envelope. Alternatively, the slotted portion of the resonator may be included in the evacuated container and the resonator proper attached externally.

Operation of the device is as follows: As electron beam 14 passes across slot 17 in resonator 16 said beam is velocity modulated in a manner well known to those familiar with the art. The modulated beam approaches repeller electrode 18 where it is reflected back towards the resonator and returns energy to it at a higher energy level than that at which it was extracted, thereby reinforcing the oscillatory currents in the resonator. By maintaining the proper relationship between the respective dimensions of resonator 16, slot 17, the distance between repeller 18 and slot 17, and repeller potential 19, oscillatory currents will be set up in resonator 16 and the entire device will act as an oscillation generator. The frequency of oscillation will be a function of the dimensions of the electrical path in the resonator between points A and B. As the region of coupling of the beam to the generator is moved along the slot said dimensions change and, therefore, the frequency of oscillation changes. The frequency of oscillation will be a function of the point or region A—B at which electron beam 14 crosses slot 17. This point A—B may be moved at will along slot 17 by varying deflecting potential 15. Thus the device functions as an oscillation generator whose generated frequency may be changed at will by varying a controlling potential.

If the frequency of oscillation is to be varied over a considerable range, it may be necessary to vary the width of the slot so that the transit time of electrons in the beam is maintained in fixed relation with the transit time of electrons in the resonator surface.

It may also be necessary to vary the transit time of the electrons in beam 14 over the path from point A—B to the region near repeller 18 and back again. This variation should preferably bear a definite relationship to the variation of deflecting potential 15. Said relationship may be accomplished in several ways, which are here described as illustrative methods and are not to be considered restrictive. Repeller 18 may be situated in space in such fashion that the distance from the small end of the tapered resonator is shorter than the distance from the large end. Said variable distance if properly proportioned will cause the transit time to vary as required.

Alternatively, while repeller 18 is positioned parallel to the slot, repeller potential 19 may be made to vary in synchronism with deflecting potential 15 in such fashion as to maintain optimum operating conditions.

Repeller 18 may also be made of a resistive material while potential 19 is applied at one end and the other end returned to the positive terminal of potential source 19 through a suitable resistor so that a potential gradient will appear along the length of said repeller.

The tapered resonator and its associated electron beam may be embodied in a dual resonator type of velocity modulated tube in such fashion that the tube will function as a variable frequency amplifier.

Figures 2 and 3 (using identical reference numerals for parts similar to those of Figure 1) show two different adaptations of the tapered resonator of the present invention.

In Figure 3, operation is similar to that of Figure 1, except that one resonator is placed above the other resonator in such manner that said electron beam passes between the respective slots in said resonators resulting in more effective velocity modulation of beam 14 with the basic characteristics of the system otherwise unchanged.

In Figure 2, where two tapered resonators 16 are placed in tandem position the device functions as an amplifier. If oscillating energy from an outside source is coupled into the resonator of Figure 1 and if the frequency of oscillation falls somewhere between the upper and lower resonant limits of said resonator, a concentration of electric field will appear at some point along the slot. Varying the frequency of the input energy will cause the concentration point to move along the slot from one end to the other. This effect may be used to produce electronically tunable amplification as shown in Figure 2.

Oscillatory energy coupled into the first resonator nearest electron gun 12 (Figure 2) causes a concentration of field at some point in the slot depending upon the frequency of said energy. The electron beam is velocity modulated as it passes this point whereupon it passes through the drift space between the two resonators and delivers energy to the second resonator at the corresponding resonant point, but on a higher energy level. Energy may therefore be coupled out of the second resonator as an amplified replica of the input. If more than one signal frequency is present in the input energy, a separate point of field concentration will appear in the slot for each different signal component. By deflecting the electrom beam back and forth over these concentration points the desired signal may be selected at will. A sweep voltage applied to the deflecting plates and oscillographic presentation of the output signals results in the simultaneous display on the oscillograph screen of all signal components present in the input. In this manner the device acts as a spectrum analyser.

Figs. 4 and 4*a* show a further embodiment of my invention wherein the resonator element 22 is in the shape of a hollow toroid of irregular dimensions which forms a closed cavity resonator of variable resonant frequency. Electron gun 12 projects a concentrated electrom beam 14 between 13 and 13*a* which are respectively vertical and horizontal pairs of deflecting plates associated wth deflecting potentials 15 and 15*a*, respectively, said potentials being shown symbolically as generators.

Tapered resonator 22 is formed in the shape of a toroid, partly cut away as illustrated in Fig. 4, and showing a slot 23 along its inner peripheral circumference, across which electron beam 14 may be selectively or variably positioned. Circular repeller electrode 24 is adapted to reflect electron beam 14 back across said slot 23. Circular slot 23 is defined by partly dotted lines 26 and 27 and is positioned in the inside periphery of resonator 22 which has a continuously varying diameter. Sources of potential are shown as batteries 19, 20 and 21 whose purpose is to maintain the respective elements at the proper relative potentials for optimum operation. Points C—D indicate the area on slotted toroid 22 at which beam 14 determines the resonance characteristics.

It will be apparent that the basic principle of operation of the embodiment of Fig. 4 is the same as that described for Figure 1 with the addition that electron beam 14 can be caused to move in a circular path by virtue of the deflecting potentials of two pairs of deflecting plates 13 and 13*a* instead of the single pair shown in Figure 1. For some high frequency applications this may be a preferable arrangement.

It will be understood that the elements of the embodiments shown in Figs. 2, 3 and 4 may also be enclosed by an envelope 11 similar to that shown in Fig. 1*a*.

Although the tapered resonators shown in the various figures of the drawings are in the form of substantially symmetrical cones, it is within the purview of this invention to provide tapered resonators having angular surfaces such as obtain on pyramids of three, four or a greater plurality of sides. Said "pyramid" shapes would also have a slot positioned longitudinally along one of the sides or corners to which the deflectable electron beam would be coupled. The tapered resonator whether conical, pyramidal or toroidal, may also be formed asymmetrically, whereby one of the surfaces or sides may be flared outward or inward to provide a desired regular or irregular characteristic or set of characteristics. Of course, the slot must be maintained in a position in which it may be traversed by the electron beam.

Whatever form the resonator has, it exhibits resonance characteristics which have a continuous gradient from one end to the other or from one predetermined portion to another predetermined portion. Thus the resonant element provides between two predetermined regions an infinite number of adjacent current paths, each path being of different length depending upon the diameter of cross-section of the resonant body in the region of the slot that is excited by the electron beam.

If desired, the repeller or collector electrode may be omitted in some embodiments of the present invention.

It is evident that deflection of the various electron beams comprising a part of the various embodiments of the invention may be accomplished by magnetic means rather than by electrostatic means as described. It should also be obvious that a combination of electrostatic and electromagnetic fields may be used to position the electron beam with respect to the tapered resonator if desired.

While the present invention, as to its objects and advantages has been described as carried out in specific embodiments thereof, it is not desired to be limited thereby but it is intended to cover the invention broadly within the spirit and scope of the appended claims.

I claim:

1. An oscillation generator which comprises a source of electrons, focusing means for concentrating said electrons into a beam, a resonator of tapered conical shape, a longitudinal slot in said tapered conical shape, said source of electrons being positioned substantially perpendicular to the longitudinal axis of said resonator whereby said beam travels across said slot in a path substantially tangential to the resonator surface, and a repeller electrode substantially parallel to said slot and positioned to reflect said beam back across said slot and deflecting means for movably positioning said beam between the respective ends of said resonator.

2. An electron tube comprising a source of electrons, focusing means for concentrating said electrons into a beam, two resonators of tapered conical shape, a longitudinal slot in each of said resonators, said resonators being positioned with relation to each other that their respective slots are facing each other while their respective small and large ends are on the same side, said source of electrons being positioned substantially perpendicular to the longitudinal axes of said resonators whereby said beam is aimed between and across said slots in a path substantially tangential to the resonator surfaces, and deflecting means for movably positioning said beam between the respective ends of said resonators.

3. A tunable amplifier which comprises a source of electrons, focusing means for concentrating said electrons into a beam, two resonators of tapered conical shape, a longitudinal slot in each of said resonators, said resonators being positioned in tandem relation to each other whereby their respective slots face substantially in the same direction and are substantially parallel to each other while their respective small and large ends are on the same side, said source of electrons being positioned substantially perpendicular to the longitudinal axes of said resonators whereby said beam is aimed across said slots in a path substantially tangential to the resonator surfaces, a repeller electrode substantially parallel to said slots and positioned to reflect said beam back across said slots, and deflecting means for movably positioning said beam between the respective ends of said resonators.

4. An electron tube which comprises a source of electrons, focussing means for concentrating said electrons into a beam, a tapered resonator in the shape of a toroid whose dimensions vary in symmetrical gradients from a section of small diameter to a section of large diameter, a circular slot on the inner peripheral circumference of said resonator, said source of electrons being positioned to aim the beam across said slot, a circular repeller electrode substantially parallel to said slot and positioned to reflect said beam back across said slot, and deflecting means for movably positioning said beam across different portions of said slot in a path substantially tangential to the inner circumference of said resonator in the region of the slot.

5. An electron tube comprising a source of electrons, focussing means for concentrating said electrons into a beam, a resonator of tapered shape coupled to said source, said beam being projected tangentially across the surface of said resonator, deflecting means for variably positioning said beam with respect to said resonator, and means for connecting a source of deflecting potential to said deflecting means whereby said electron tube acts as an oscillation generator whose frequency is a function of said deflecting potential.

6. An electron tube comprising a source of electrons, focussing means for concentrating said electrons into a beam, a resonator of tapered shape coupled to said source, said beam being projected tangentially across the surface of said resonator, deflecting means for variably positioning said beam with respect to said resonator, a repeller electrode for reflecting said beam to said resonator, and means for connecting a source of deflecting potential to said deflecting means whereby said electron tube acts as an oscillation generator whose frequency is a function of said deflecting potential.

7. An electron tube comprising a resonator of tapered shape, a longitudinal slot in said resonator, a source of electrons coupled to said resonator, focussing means for concentrating said electrons into a beam directed tangentially to said resonator and across said slot, and deflecting means for variably positioning the region of coupling of said beam across said slot.

8. A resonator system comprising at least one resonator of tapered shape, a longitudinal slot in said resonator, a source of electrons coupled to said resonator, focussing means for concentrating said electrons into a beam and projecting said beam of electrons across said slot substantially tangential to the surface of said resonator.

9. A resonator system according to claim 8 further comprising deflecting means for variably positioning said beam across different portions of said slot.

10. An electron tube comprising a resonator of tapered shape, a source of electrons, focussing means for concentrating said electrons into a beam, said beam being projected substantially tangentially to the surface of and being coupled to a point on said resonator, and deflecting means for changing said point of coupling along said resonator.

11. An electron tube comprising at least one resonator of tapered shape, a source of electrons, focussing means for concentrating said electrons into a beam, said beam being projected substantially tangentially to the surface of and being coupled to a point on said resonator, and deflecting means for changing said point of coupling along said resonator.

12. An electron tube comprising a resonator consisting of a conductive sheet bounding a tapered cavity, said resonator being capable of exhibiting an infinite number of oscillating modes, a source of electrons, focussing means for concentrating said electrons into a beam, said beam being projected tangentially across the surface of said resonator to be coupled to a point thereon, and deflecting means for changing the region of coupling between said beam and said resonator whereby said modes may be selected.

13. An electron tube comprising a resonator consisting of a conductive sheet bounding a tapered cavity, a longitudinal slot in said resonator, said resonator being capable of exhibiting an infinite number of resonant frequencies, a source of electrons, focussing means for concentrating said electrons into a beam, said beam being projected tangentially across the surface of said resonator and across said slot, said beam being thereby coupled to a point on said resonator, and deflecting means for changing the region of coupling between said beam and said resonator thereby selectively changing the resonant frequency.

14. An electron tube comprising a pair of resonators of tapered shape, a longitudinal slot in each resonator, a source of electrons coupled to said resonators, said resonators being arranged in tandem array relative to said source, focussing means for concentrating said electrons into a beam directed substantially tangentially to the respective surfaces of said resonators and across said slots, said beam being coupled to respective points on said resonators, and selecting means for variably positioning the points of coupling of said beam across said respective slots.

15. An amplifier comprising a pair of resonators of tapered shape, a longitudinal slot in each resonator, a source of electrons coupled to said resonators, said resonators being mounted in tandem relative to said source, means for concentrating said electrons into a beam and projecting said beam tangentially to said resonators and across said slots, said beam being coupled to respective points on said resonators, deflecting means for variably positioning the points of coupling of said beam across different portions of said slots, a repeller electrode for reflecting said beam to said resonators, and means for connecting a source of deflecting potential to said deflecting means, whereby the operating frequency of said amplifier is a function of said deflecting potential.

16. In combination, a resonator having a tapered shape, a longitudinal slot in said resonator, a source of electrons coupled to said resonator, means for concentrating said electrons into a beam, means for coupling said beam to said resonator and directing said beam tangentially to the surface of said resonator and across said slot at a point to induce current in said resonator, and means for selectively positioning said beam along different points of said slot to vary the current induced at any selected point.

MAURICE APSTEIN.

References Cited in the file of this patent

UNITED STATES PATENTS

| Number | Name | Date |
|---|---|---|
| 2,275,480 | Varian et al. | Mar. 10, 1942 |
| 2,288,694 | Fry | July 7, 1942 |
| 2,289,319 | Strobel | July 7, 1942 |

| Number | Name | Date |
|---|---|---|
| 2,368,328 | Rosencrans | Jan. 30, 1945 |
| 2,399,325 | Condon | Apr. 30, 1946 |
| 2,407,708 | Kilgore et al. | Sept. 17, 1946 |
| 2,409,179 | Anderson | Oct. 15, 1946 |
| 2,412,372 | Usselman | Dec. 10, 1946 |
| 2,463,617 | Hartley | Mar. 8, 1949 |
| 2,509,419 | Brown | May 30, 1950 |
| 2,608,669 | Hurvitz | Aug. 26, 1952 |

FOREIGN PATENTS

| Number | Country | Date |
|---|---|---|
| 215,602 | Switzerland | Oct. 1, 1941 |